US012759788B2

(12) United States Patent
Kawashima et al.

(10) Patent No.: US 12,759,788 B2

(45) Date of Patent: Oct. 13, 2026

(54) STACKER CRANE

(71) Applicant: DAIFUKU CO., LTD., Osaka (JP)

(72) Inventors: Tomohiko Kawashima, Shiga (JP); Ryo Nakagawa, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 316 days.

(21) Appl. No.: 18/595,813

(22) Filed: Mar. 5, 2024

(65) Prior Publication Data

US 2024/0308761 A1 Sep. 19, 2024

(30) Foreign Application Priority Data

Mar. 14, 2023 (JP) ................................ 2023-040077

(51) Int. Cl.

| | |
|---|---|
| ***B66F 9/07*** | (2006.01) |
| ***B25J 11/00*** | (2006.01) |
| ***B25J 18/00*** | (2006.01) |
| ***B65G 1/04*** | (2006.01) |
| ***B66F 9/08*** | (2006.01) |
| *B66F 9/24* | (2006.01) |

(52) U.S. Cl.

CPC ......... *B65G 1/0421* (2013.01); *B65G 1/0428* (2013.01); *B66F 9/08* (2013.01); *B66F 9/24* (2013.01)

(58) Field of Classification Search

CPC .. B65G 1/0421; B65G 1/0428; B65G 1/0407; B65G 61/00; B66F 9/08; B66F 9/24; B66F 9/072; B66F 9/07; B66F 9/07572; B25J 18/00; B25J 11/00

See application file for complete search history.

(56) References Cited

U.S. PATENT DOCUMENTS

| | | | | |
|---|---|---|---|---|
| 8,807,234 | B2 * | 8/2014 | Ariizumi | B66F 9/07 169/37 |
| 2004/0216957 | A1 * | 11/2004 | Hansl | B66F 9/07 187/289 |
| 2006/0051190 | A1 | 3/2006 | Taguchi | |
| 2014/0072392 | A1 * | 3/2014 | Tanahashi | B66F 9/07 414/277 |
| 2017/0057745 | A1 * | 3/2017 | Ueda | B65G 1/1373 |
| 2018/0111754 | A1 * | 4/2018 | Masuda | B66F 9/24 |

(Continued)

FOREIGN PATENT DOCUMENTS

| | | | |
|---|---|---|---|
| JP | 2004035150 | A | 2/2004 |
| JP | 2005-029366 | A | 2/2005 |

(Continued)

OTHER PUBLICATIONS

Office Action dated Oct. 28, 2025 issued in Japanese patent application No. 2023-040077.

*Primary Examiner* — Saul Rodriguez

*Assistant Examiner* — Jaimin G Patel

(74) *Attorney, Agent, or Firm* — Harness, Dickey & Pierce, P.L.C.

(57) ABSTRACT

Weight reduction of a carriage of a stacker crane is achieved. A stacker crane includes: a mast; a carriage provided so as to be capable of being raised and lowered with respect to the mast; a movable section mounted to the carriage and configured to be movable with respect to the carriage; and a movement control instrument configured to control motive power supplied to the movable section, the movement control instrument being disposed outside the carriage.

11 Claims, 8 Drawing Sheets

(56) References Cited

U.S. PATENT DOCUMENTS

| | | | | |
|---|---|---|---|---|
| 2018/0224311 | A1* | 8/2018 | Ueda | G01F 7/005 |
| 2019/0119040 | A1* | 4/2019 | Tsukamoto | B65G 1/0407 |
| 2020/0385253 | A1* | 12/2020 | Maurer | B66F 9/205 |
| 2021/0309457 | A1* | 10/2021 | Tsuji | B65G 1/0421 |
| 2022/0227578 | A1* | 7/2022 | Kiyokawa | B66F 9/20 |
| 2022/0340360 | A1* | 10/2022 | Kiyokawa | B66F 9/07 |

FOREIGN PATENT DOCUMENTS

| | | | |
|---|---|---|---|
| JP | 2007230748 | A | 9/2007 |
| JP | 2011-201608 | A | 10/2011 |
| JP | 2012076859 | A | 4/2012 |

* cited by examiner

STACKER CRANE

This Nonprovisional application claims priority under 35 U.S.C. § 119 on Patent Application No. 2023-040077 filed in Japan on Mar. 14, 2023, the entire contents of which are hereby incorporated by reference.

TECHNICAL FIELD

The present invention relates to a stacker crane.

BACKGROUND ART

In the conventional art, there is known a stacker crane that transports articles and loads or unloads articles on or from a load shelf. For example, Patent Literature 1 describes a stacker crane that includes: a crane body that travels on a rail provided on a floor surface; a mast that is erected on the crane body; a load-carrying platform that is provided to the mast so as to be capable of being raised and lowered; and a plurality of control devices that control the operations of individual sections provided in the stacker crane.

Provided on the load-carrying platform having a placement part on which a container is placed are: a loading and unloading motor for loading and unloading the container; and a drive unit for performing loading and unloading of the container. By driving the loading and unloading motor, the drive unit is moved with respect to the load-carrying platform, and the container is loaded or unloaded between the load-carrying platform and the load shelf.

CITATION LIST

Patent Literature

[Patent Literature 1]

Japanese Patent Application Publication, Tokukai, No. 2011-201608

SUMMARY OF INVENTION

Technical Problem

However, in Patent Literature 1, a control device for controlling the loading and unloading motor is mounted in the load-carrying platform. Thus, the weight of the load-carrying platform increases by an amount corresponding to the weight of the control device mounted in the load-carrying platform.

An object of an aspect of the present invention is to achieve weight reduction of a carriage of a stacker crane.

Solution to Problem

In order to solve the above problem, a stacker crane in accordance with an aspect of the present invention includes: a mast; a carriage provided so as to be capable of being raised and lowered with respect to the mast; a movable section mounted to the carriage and configured to be movable with respect to the carriage; and a movement control instrument configured to control motive power supplied to the movable section. The movement control instrument is disposed outside the carriage.

Advantageous Effects of Invention

An aspect of the present invention makes it possible to achieve weight reduction of a carriage of a stacker crane.

DESCRIPTION OF EMBODIMENTS

Embodiment 1

The following will describe an embodiment of the present invention in detail with reference to FIGS. 1 to 8.

[Article Transport System]

Figure 1:
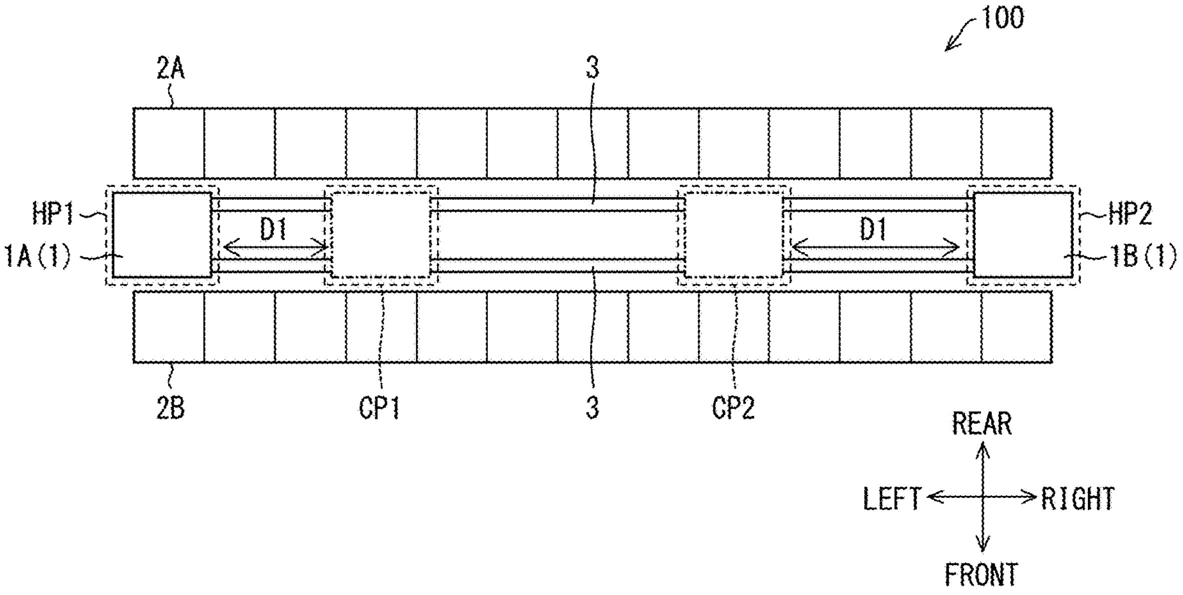
FIG. 1 is a view for describing an overview of an article transport system in accordance with an embodiment of the present invention.

An overview of an article transport system 100 will be described with reference to FIG. 1. FIG. 1 is a view for describing the overview of the article transport system 100. Note that the article transport system 100 illustrated in FIG. 1 is an example of a system in which a stacker crane in accordance with an embodiment of the present invention is employed. Further, for convenience of description, an up-down direction, a front-rear direction, and a right-left direction are defined as indicated by arrows in FIG. 1, etc. Note that, in the present embodiment, the up-down direction is a direction orthogonal to the front-rear direction and the right-left direction, and the front-rear direction is a direction orthogonal to the right-left direction.

The article transport system 100 illustrated in FIG. 1 includes a stacker crane 1 and load shelves 2A and 2B. The Load shelves 2A and 2B are shelves on which articles can be placed. The load shelves 2A and 2B are each provided with a plurality of stages in the up-down direction, and a space for placing articles is partitioned in the right-left direction of each stage. Traveling guide rails 3 constituting a traveling path of the stacker crane 1 are installed on the floor between the load shelf 2A and the load shelf 2B, and the stacker crane 1 is capable of traveling a distance between the load shelf 2A and the load shelf 2B. The load shelf 2A is located behind the stacker crane 1, and the load shelf 2B is located in front of the stacker crane 1.

The stacker crane 1 is an apparatus for transporting an article. The height of the stacker crane 1 in the up-down direction is about 2 m to 18 m. The stacker crane 1 travels along the traveling guide rails 3. In the present embodiment, a traveling direction D1 of the stacker crane 1 in which the stacker crane 1 travels is the right-left direction. The article transport system 100 may include a plurality of stacker cranes 1. In the present embodiment, two stacker cranes 1 travel on the traveling guide rails 3. Note that the article transport system 100 may be configured such that one stacker crane 1 travels on the traveling guide rails 3.

In the following description, the stacker crane 1 illustrated in the left-hand part of FIG. 1 is referred to as a stacker crane 1A, and the stacker crane 1 illustrated in the right-hand part of FIG. 1 is referred to as a stacker crane 1B.

In a case where the stacker cranes 1A and 1B are in a standby state in which no article is transported, the stacker cranes 1A and 1B are kept on standby at home positions HP1 and HP2, respectively. The home position HP1 is provided on the left-end side of the traveling guide rails 3, and the home position HP2 is provided on the right-end side of the traveling guide rails 3. In a case where articles are transported, the stacker crane 1A moves from the home position HP1 to a transport position CP1, and the stacker crane 1B moves from the home position HP2 to a transport position CP2. The transfer positions CP1 and CP2 are positions at which an article can be loaded or unloaded on or from the load shelf 2A or 2B. The transfer positions CP1 and CP2 vary according to the position of an article which is to be placed or is placed on the load shelf 2A or 2B.

The transport position CP1 of the stacker crane 1A is a position that is on the traveling guide rails 3 and that is more rightward than the home position HP1, and the transport position CP2 of the stacker crane 1B is a position that is on the traveling guide rails 3 and that is more leftward than the home position HP2. The stacker crane 1A moves leftward and rightward between the home position HP1 and the transport position CP1, and the stacker crane 1B moves leftward and rightward between the home position HP2 and the transport position CP2.

For example, in a case where the stacker crane 1A loads or unloads an article which is to be placed or is placed in the fourth row from the left on the load shelf 2B on the front side, the stacker crane 1A moves from the home position HP1 to the transport position CP1 illustrated in FIG. 1. Upon completion of the loading or unloading of the article at the transport position CP1, the stacker crane 1A returns to the home position HP1.

[Stacker Crane]

Figure 2:
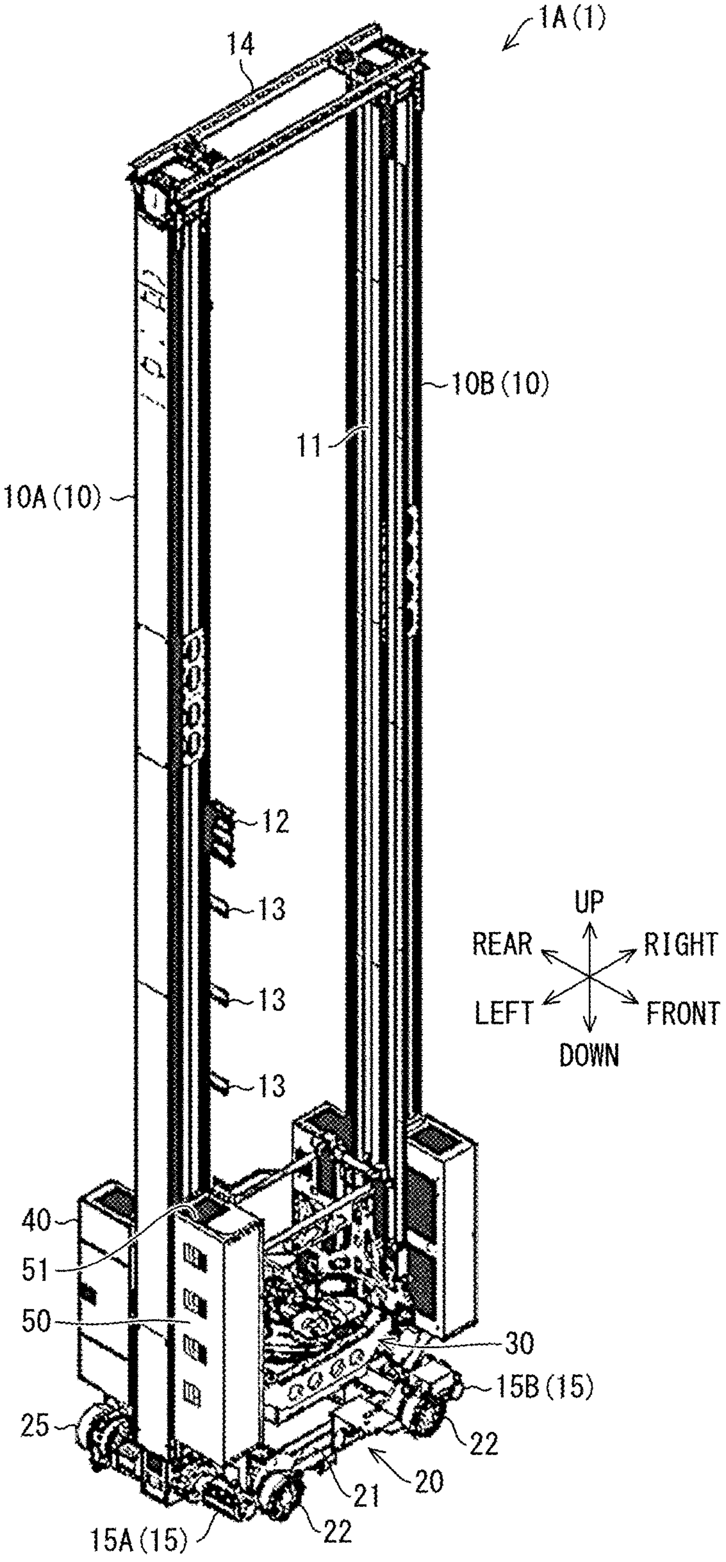
FIG. 2 is a perspective view illustrating a stacker crane in accordance with an embodiment of the present invention.
Figure 3:
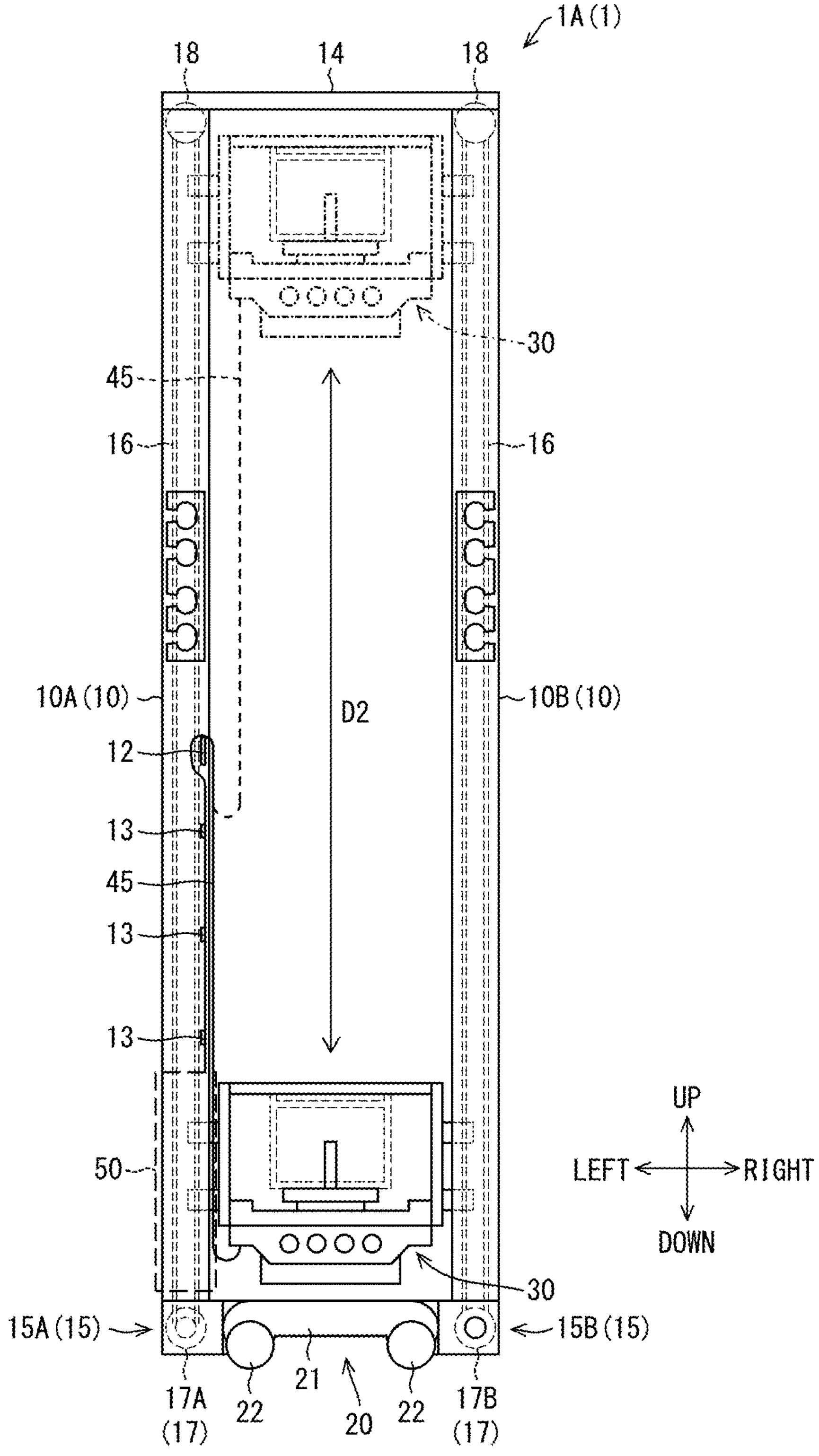
FIG. 3 is an elevation view of the stacker crane illustrated in FIG. 2 when viewed from the front.

Next, a detailed configuration of the stacker crane 1 will be described with reference to FIGS. 2 and 3. FIG. 2 is a perspective view illustrating the stacker crane 1A. FIG. 3 is an elevation view of the stacker crane 1A illustrated in FIG. 2 when viewed from the front. Since the stacker crane 1A and the stacker crane 1B have the same configuration, only the stacker crane 1A will be described, and description of the stacker crane 1B will be omitted. As illustrated in FIG. 2, the stacker crane 1A includes a mast 10, a traveling vehicle 20, a carriage 30, a control box 40, and a driver box 50.

The mast 10 is a columnar member that extends in the up-down direction. The stacker crane 1A is provided with a pair of masts 10. Note that, in the following description, the mast 10 illustrated in the left-hand part of the drawing (the mast 10 on the side closer to the home position HP1) is referred to as a first mast 10A, and the mast 10 illustrated in the right-hand part of the drawing (the mast 10 on the side closer to the transport position CP1) is referred to as a second mast 10B.

The first mast 10A and the second mast 10B are spaced apart from each other in the right-left direction. The carriage 30 (described later) is provided between the first mast 10A and the second mast 10B. The first mast 10A and the second mast 10B are each provided with a raising and lowering guide rail 11. The raising and lowering guide rail 11 guides the carriage 30 in the up-down direction.

Between the tops of the masts 10, an upper frame 14 is provided. The upper frame 14 is provided so as to connect an upper end portion of the first mast 10A and an upper end portion of the second mast 10B. The upper frame 14 is engaged with an upper guide rail (not illustrated) and guides, by the upper guide rail, the stacker crane 1A in the traveling direction D1.

As illustrated in FIG. 3, raising and lowering motor units 15, which are drive units for raising and lowering the carriage 30 with respect to the corresponding masts 10, the are provided below corresponding masts 10. The raising and lowering motor units 15 have respective raising and lowering motors 151 (see FIG. 8) that drive corresponding drive drums 17 which are provided below the corresponding masts 10. The raising and lowering motors 151 are each provided on the front side of a corresponding one of the masts 10.

Note that, in the following description, the raising and lowering motor unit 15 and the drive drum 17 which are provided for the first mast 10A are referred to as a raising and lowering motor unit 15A and a drive drum 17A, respectively. The raising and lowering motor 151 of the raising and lowering motor unit 15A is referred to as a raising and lowering motor 151A (see FIG. 8). The raising and lowering motor unit 15 and the drive drum 17 which are provided for the second mast 10B are referred to as a raising and lowering motor unit 15B and a drive drum 17B, respectively. The raising and lowering motor 151 of the raising and lowering motor unit 15B is referred to as a raising and lowering motor 151B (see FIG. 8). The raising and lowering motor 151A drives the drive drum 17A. The raising and lowering motor 151B drives the drive drum 17B.

Raising and lowering wires 16 each having one end fixed to the carriage 30 are wound on the corresponding drive drums 17. In the upper regions of the masts 10, the raising and lowering wires 16 are engaged by corresponding pulleys 18 that are provided in the corresponding masts 10. The pulleys 18 are rotated by advance and retraction of the corresponding raising and lowering wires 16. Forward or backward rotation of the raising and lowering motors 151 causes the raising and lowering wires 16 to advance or retract with respect to the drive drums 17. Thus, the carriage 30 is moved in the up-down direction with respect to the masts 10, that is, the carriage 30 is raised and lowered in a raising and lowering direction D2. As illustrated in FIG. 3, the carriage 30 is raised and lowered between a lowermost position indicated by a solid line and an uppermost position indicated by a broken line by drive forces from the raising and lowering motor units 15. The raising and lowering motor units 15, the raising and lowering wires 16, the drive drums 17, and the pulleys 18 are examples of a lifting section.

On a front surface of the first mast 10A, a first support portion 12 and second support portions 13 are provided. The first support portion 12 and the second support portions 13 support a raising and lowering cable 45 (described later) (see FIG. 3). Note that, in FIG. 2, the raising and lowering cable 45 is not illustrated for the sake of ease of viewing of the drawing. The first support portion 12 is located above the second support portions 13. The first support portion 12 is provided at about midpoint position of the first mast 10A in the up-down direction. As illustrated in FIG. 3, the raising and lowering cable 45 is bent at a portion supported by the first support portion 12.

The traveling vehicle 20 has a vehicle frame 21 and a traveling motor unit 25. The traveling vehicle 20 is an example of a traveling section. The masts 10 are erected on the vehicle frame 21. The vehicle frame 21 also has wheels 22 that travel on the traveling guide rails 3.

The vehicle frame 21 is provided with a traveling motor unit 25 that is a drive unit for causing the stacker crane 1A to travel. More specifically, the traveling motor unit 25 is provided on the left side of the vehicle frame 21 in the right-left direction and is provided on the rear side of the vehicle frame 21 in the front-rear direction. The traveling motor unit 25 is disposed rearward of the masts 10. The traveling motor unit 25 has a traveling motor 26 (FIG. 8), and the wheels 22 are rotated by transmission of a drive force from the traveling motor 26 to the wheels 22. When the wheels 22 are rotated, the stacker crane 1A is guided by the traveling guide rails 3 and travels along the traveling direction D1.

[Carriage]

Figure 4:
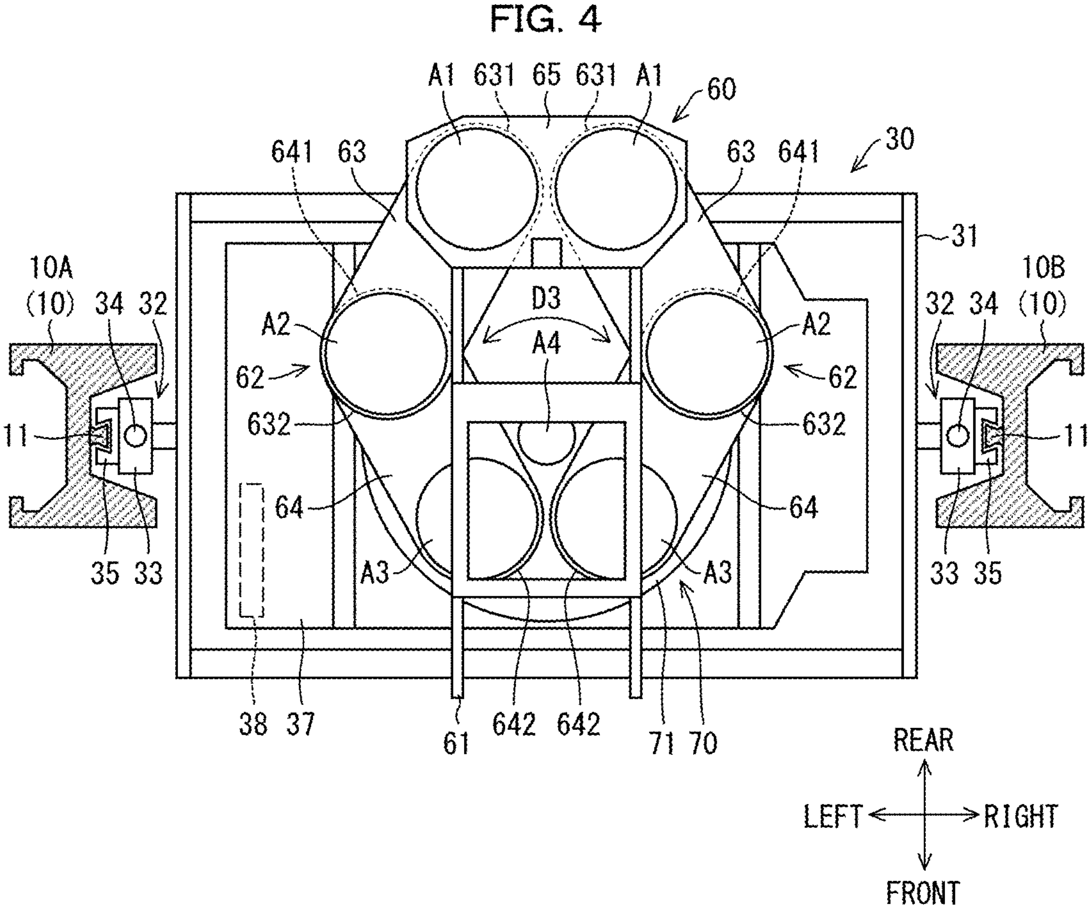
FIG. 4 is a plan view illustrating a carriage provided in the stacker crane when viewed from above.
Figure 5:
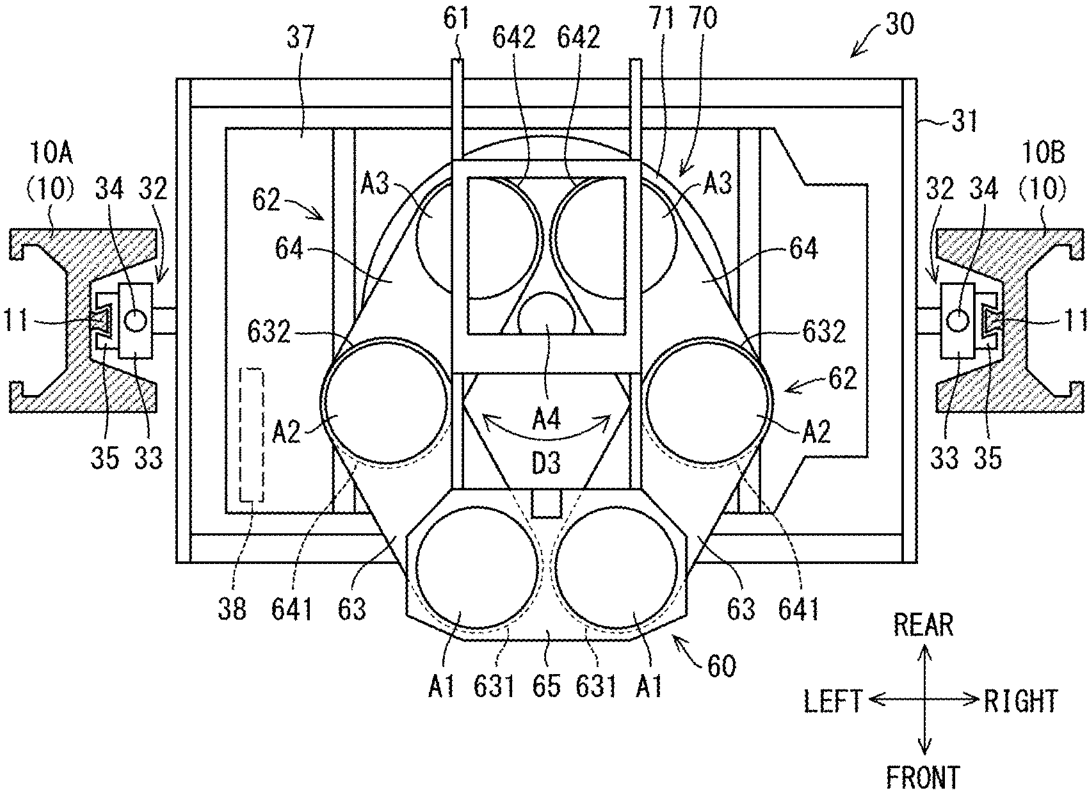
FIG. 5 is a plan view illustrating the carriage provided in the stacker crane when viewed from above.
Figure 6:
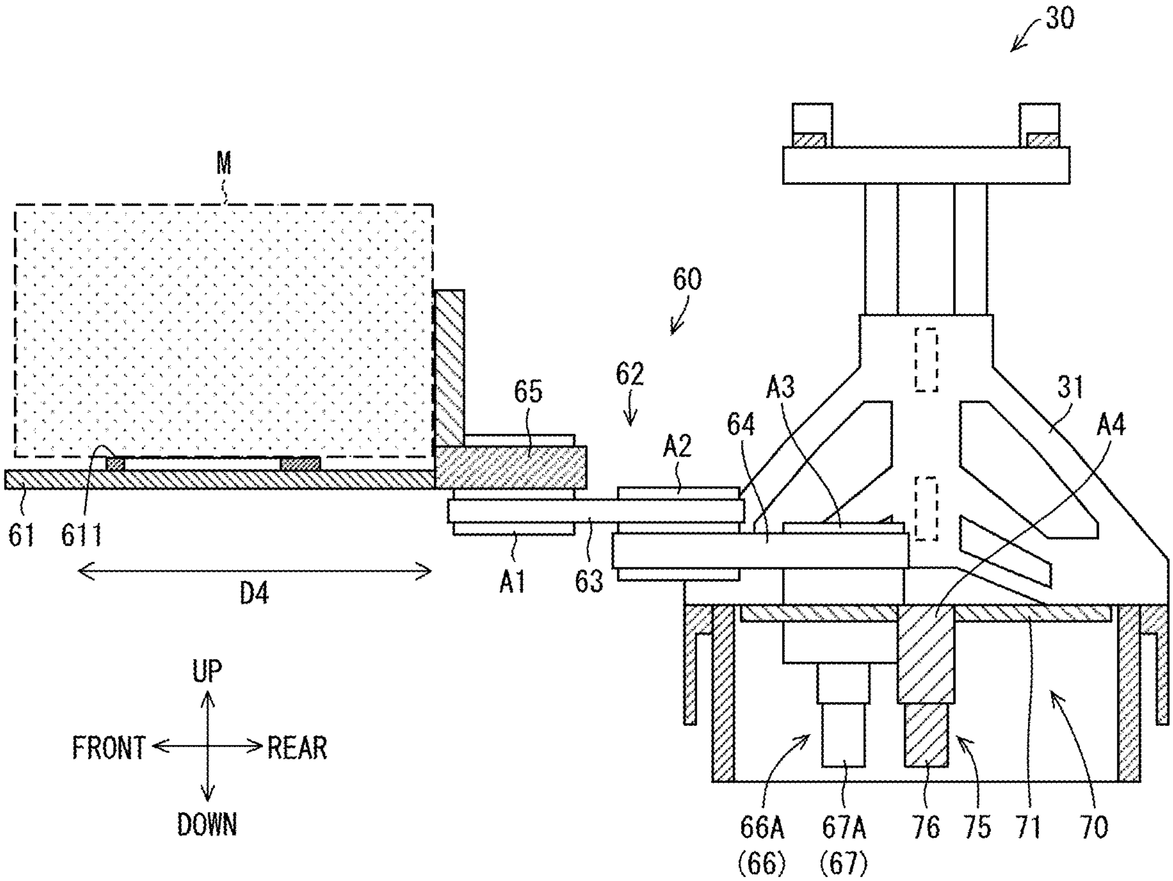
FIG. 6 is a cross-sectional view illustrating the carriage provided in the stacker crane when viewed from the right side.

A detailed configuration of the carriage 30 will be described with reference to FIGS. 4 to 6. FIG. 4 is a plan view illustrating the carriage 30 provided in the stacker crane 1A when viewed from above. FIG. 5 is a plan view illustrating the carriage 30 provided in the stacker crane 1A when viewed from above. FIG. 6 is a cross-sectional view illustrating the carriage 30 provided in the stacker crane 1A when viewed from the right side.

The carriage 30 allows an article M to be placed thereon (see FIG. 6) and is provided so as to be capable of being raised and lowered with respect to the masts 10. As illustrated in FIGS. 4 and 5, the carriage 30 includes a carriage frame 31, a fork section 60, a turning section 70, and a cable box 37. The fork section 60 and the turning section 70 are mounted on the carriage frame 31.

The carriage frame 31 is provided with guide sections 32 that guide the carriage 30 in the raising and lowering direction D2 with the advance and retraction of the raising and lowering wires 16. The guide sections 32 have respective fixing parts 33 and guide shoes 35. Each of the fixing parts 33 fixes one end of a corresponding one of the raising and lowering wires 16 that are inserted through the corresponding openings 34 which are formed in the corresponding fixing parts 33. With the advance and retraction of the raising and lowering wires 16, the fixing parts 33 are towed upward, or the fixing parts 33 are lowered downward. The guide shoes 35 are engaged with the corresponding raising and lowering guide rails 11 of the masts 10 and slide with respect to the corresponding raising and lowering guide rails 11.

The fork section 60 loads or unloads the article M from the load shelve 2A or 2B to the carriage 30 and vice versa. The fork section 60 is an example of a movable section. The fork section 60 is provided on a turning frame 71 of the turning section 70 (described later). The fork section 60 has a fork 61, arm sections 62, a gear box 65, and fork motor units 66. The fork 61 has a placement surface 611 (see FIG. 6) on which an article M can be placed. The upper surface of the fork 61 is the placement surface 611. The fork 61 is attached to the gear box 65.

The arm sections 62 are a pair of arm sections provided on the right and left. With the movement of the arm sections 62 in the front-rear direction, the fork 61 moves in an advance and retraction direction D4 (see FIG. 6) with respect to the carriage 30. The arm sections 62 each have a first arm 63 and a second arm 64. On a first end 631 side in the longitudinal direction of the first arm 63, the first arm 63 is connected to the fork 61 through the gear box 65. The first arm 63 turns with respect to the gear box 65 about a turning axis A1.

On a second end 632 side in the longitudinal direction of the first arm 63, the first arm 63 is connected to the second arm 64. In other words, the first arm 63 is provided on the first end 641 side in the longitudinal direction of the second arm 64. The first arm 63 turns with respect to the second arm 64 about a turning axis A2.

On a second end 642 side in the longitudinal direction of the second arm 64, the second arm 64 is connected to a fork motor 67 (see FIG. 6) that the fork motor unit 66 has. The fork motor unit 66 is a drive unit for moving the fork 61 in the advance and retraction direction D4. With transmission of a drive force from the fork motor 67, the second arm 64 turns with respect to the carriage 30 about a turning axis A3.

The fork motor unit 66 is one of a plurality of fork motor units 66. The fork motor units 66 each have a fork motor 67 and an encoder 68 (see FIG. 8). Note that, in the following description, the fork motor unit 66 that is connected to one arm section 62 among the pair of arm sections 62 is referred to as a fork motor unit 66A. The fork motor 67 and the encoder 68 of the fork motor unit 66A are referred to as a fork motor 67A and an encoder 68A, respectively. The fork motor unit 66 that is connected to another arm section 62 among the pair of arm sections 62 is referred to as a fork motor unit 66B. The fork motor 67 and the encoder 68 of the fork motor unit 66B are referred to as a fork motor 67B and an encoder 68B, respectively.

Forward or backward rotation of the fork motors 67 causes the pair of second arms 64 to turn about the turning axes A3. The turning of the second arms 64 about the turning axes A3 causes first ends 641 of the second arms 64 to move in a front or rear direction. With the movement of the first ends 641 of the second arms 64 in the front or rear direction, the pair of first arms 63 are each moved in the front or rear direction. At this time, second ends 632 of the first arms 63 are turned with respect to the second arms 64, and first ends 631 of the first arms 63 are turned with respect to the gear box 65. With the movement of the first ends 631 of the first arms 63 in the front or rear direction, the fork 61 is moved in the front or rear direction together with the gear box 65. In the present embodiment, the advance and retraction direction D4 of the fork 61 of the fork section 60 is the front-rear direction.

The turning section 70 turns the fork section 60 by rotating with respect to the carriage 30. The turning section 70 is an example of a movable section. The turning section 70 has a turning frame 71 and a turning motor unit 75.

The turning frame 71 is a disk-shaped member, and the fork section 60 is provided thereon. The turning frame 71 is connected to a rotation shaft A4 of a turning motor 76 (see FIG. 6) of the turning motor unit 75. The turning motor unit 75 is a drive unit that rotates the turning frame 71. The turning motor unit 75 has a turning motor 76 and an encoder 77 (see FIG. 8). When a drive force is applied to the turning frame 71 from the turning motor 76, the turning frame 71 is rotated about the rotation axis A4. The rotation of the turning frame 71 with respect to the carriage 30 causes the fork section 60 to turn in the turning direction D3 with respect to the carriage 30.

The position of the fork section 60 illustrated in FIG. 4 is a position that allows the article M to be loaded or unloaded on or from the load shelf 2B which is located on the front side of the stacker crane 1A. At this time, when the turning frame 71 of the turning section 70 rotates 180 degrees, the fork section 60 is turned from the position illustrated in FIG.

4 to the position illustrated in FIG. 5. The position of the fork section 60 illustrated in FIG. 5 is a position that allows the article M to be loaded or unloaded on or from the load shelf 2A which is located on the rear side of the stacker crane 1A.

The cable box 37 is a box in which cables for connecting various devices, such as a sensor(s), mounted to the carriage 30 and a device(s) disposed outside the carriage 30 are congregated. The cable box 37 is disposed on the left side (home position HP1 side) with respect to the carriage 30. Congregated in the cable box 37 are cables for transmitting signals with respect to the fork motor units 66 and the turning motor unit 75 mounted to the carriage 30.

The cable box 37 is provided with a connector plate 38 into which a connector for connecting the raising and lowering cable 45 is installed. The connector plate 38 is located on a first mast 10A side (left side) in the right-left direction. Further, the connector plate 38 is located on a driver box 50 side (front side) in the front-rear direction.

With the connector plate 38 provided as described above, it is possible to shorten a distance between each of drivers 52 to 58 (described later) and the connector plate 38 in the right-left direction. This makes it possible to shorten a cable length of the raising and lowering cable 45 (described later). Further, it is possible to shorten a distance between each of the drivers 52 to 58 and the connector plate 38 in the front-rear direction. This makes it possible to further shorten the cable length of the raising and lowering cable 45.

[Control Box]

The control box 40 is attached to the first mast 10A. The control box 40 is attached to the rear side of the first mast 10A in the front-rear direction. The control box 40 is a casing in which a control device 41 for carrying out electronic control of the entire stacker crane 1A is housed.

The control device 41 is constituted by a computer that includes a processor such as a central processing unit (CPU), a memory such as RAM or ROM, and a communication interface. The processor of the control device 41 performs various controls and various operations by executing various programs stored in the memory.

Figure 8:
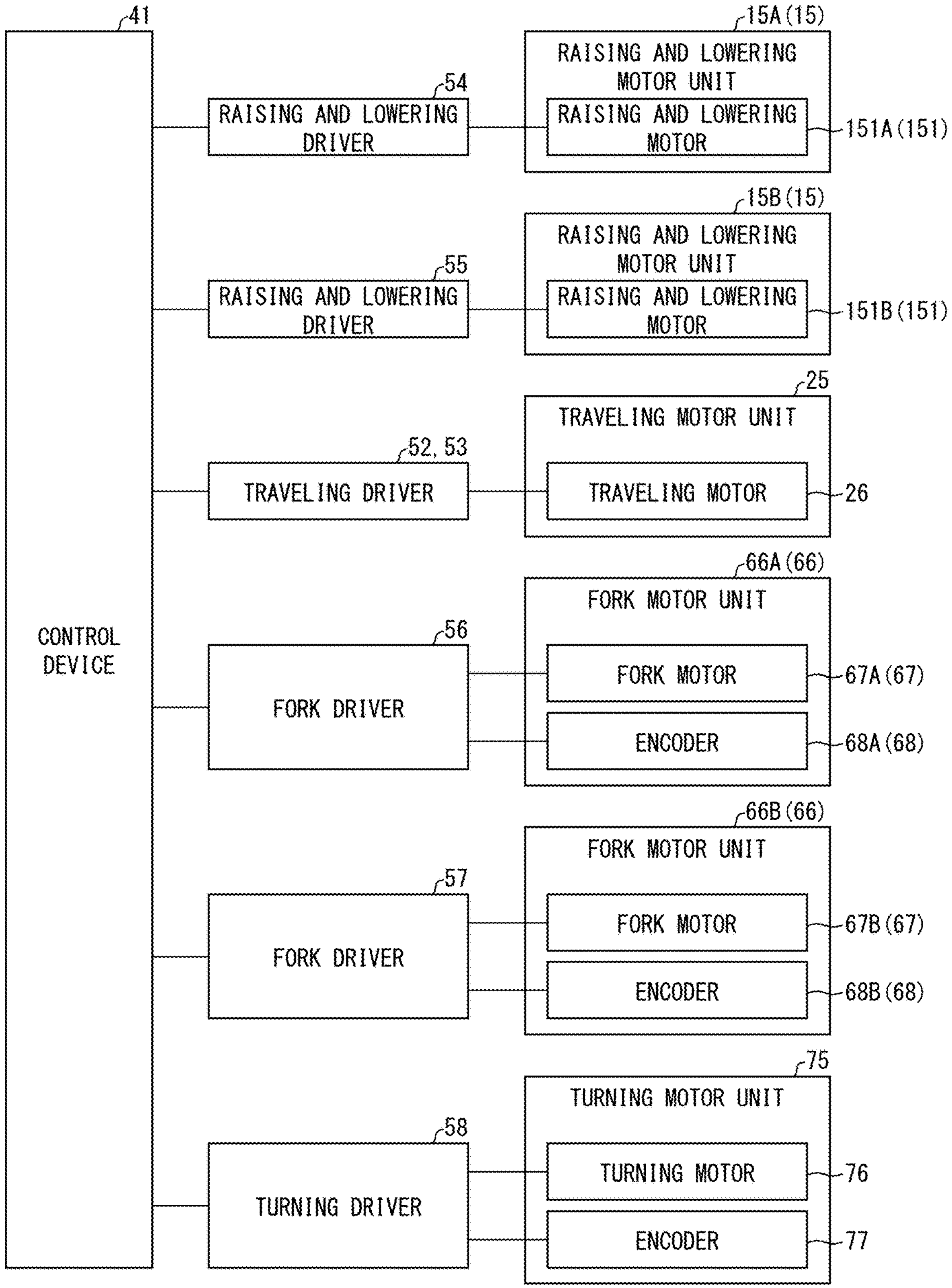
FIG. 8 is a block diagram illustrating an electrical configuration of the stacker crane illustrated in FIG. 1.

As illustrated in FIG. 8, the control device 41 is connected to traveling drivers 52 and 53 that carry out control of motive power supplied to the traveling motor unit 25, raising and lowering drivers 54 and 55 that carry out control of motive power supplied to the corresponding raising and lowering motor units 15, fork drivers 56 and 57 that carry out control of motive power supplied to the corresponding fork motor units 66, and a turning driver 58 that carries out control of motive power supplied to the turning motor unit 75 so that information communication can be carried out.

The control device 41 controls each of the drivers 52 to 58. Specifically, the control device 41 transmits a command signal to each of the drivers 52 to 58 and controls the operation of each of the drivers 52 to 58. More specifically, the control device 41 transmits a position command to each of the drivers 52 to 58. Each of the drivers 52 to 58 outputs electric power to be supplied to a corresponding one of the motor units 15, 25, 66, and 75 on the basis of a command signal from the control device 41.

[Driver Box]

As illustrated in FIG. 2, the driver box 50 is attached to the first mast 10A. The driver box 50 is an example of a casing in which control instruments are housed. The driver box 50 is attached to the front side of the first mast 10A in the front-rear direction. Provided in an upper portion of the cable box 50 is a connector plate (not illustrated) into which a connector for connecting the raising and lowering cable 45 is installed. The raising and lowering cable 45 is connected to the connector plate in the driver box 50 through an opening 51 formed in the upper portion of the driver box 50.

As described above, according to the configuration in which the driver box 50 is attached to the front side of the first mast 10A, that is, in a direction orthogonal to the traveling direction D1, the driver box 50 is not located on a side more outward of the stacker crane 1A than the first mast 10A in the traveling direction D1. Therefore, it is possible to reduce the size of the stacker crane 1A in the traveling direction D1.

Figure 7:
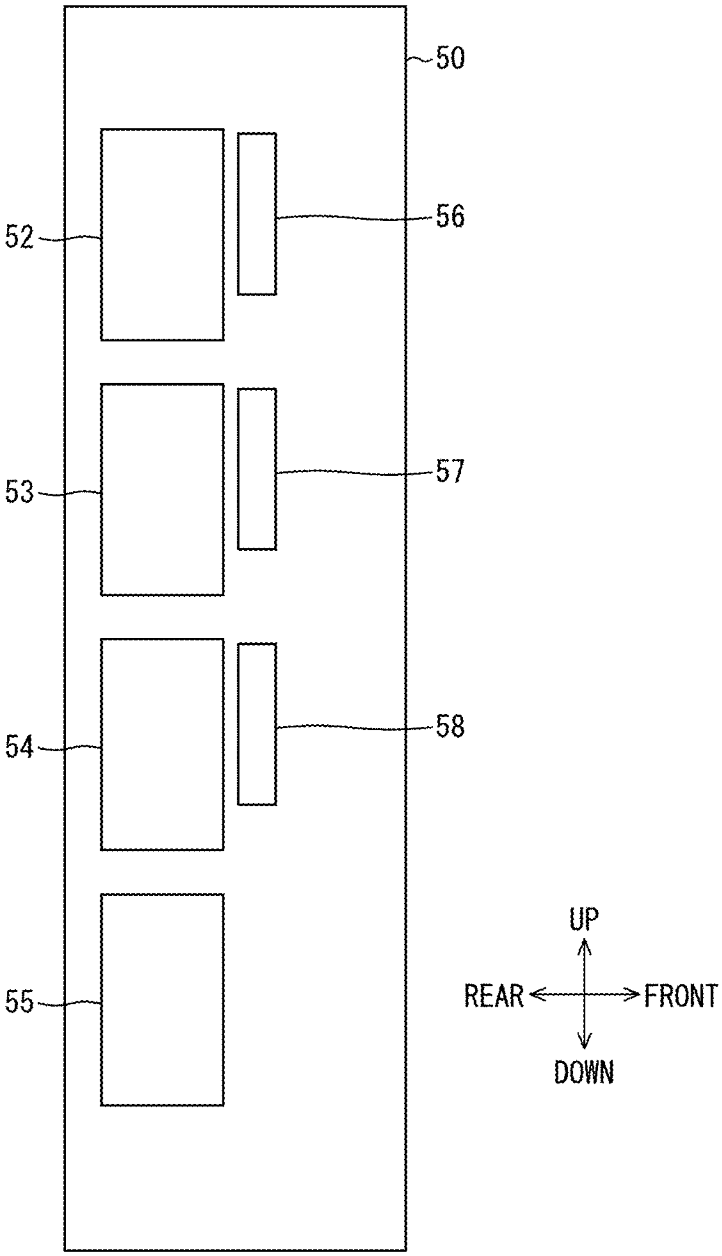
FIG. 7 is a view for describing a layout inside a driver box that is attached to a mast of the stacker crane.

As illustrated in FIG. 7, housed in the driver box 50 are the traveling drivers 52 and 53, the raising and lowering drivers 54 and 55, the fork drivers 56 and 57, and the turning driver 58. The raising and lowering drivers 54 and 55 are examples of a raising and lowering control instrument, the traveling drivers 52 and 53 are examples of a traveling control instrument, and the fork drivers 56 and 57 and the turning driver 58 are examples of a movement control instrument. The drivers 52 to 58 are congregated in one driver box 50. The fork drivers 56 and 57 and the turning driver 58 are disposed outside the carriage 30.

As described above, the fork drivers 56 and 57 and the turning driver 58 are disposed in the driver box 50. Therefore, it is possible to shorten a distance between the fork drivers 56 and 57 and the fork section 60 and a distance between the turning driver 58 and the turning section 70. This makes it possible to shorten a cable length of the raising and lowering cable 45 (described later). In addition, the drivers 52 to 58 that control motive power supplied to the corresponding motor units 15, 25, 66, and 75 which are provided in the stacker crane 1A are congregated in one casing. This makes it possible to improve the work efficiency of maintenance of the drivers 52 to 58 by the user.

In the driver box 50, the traveling drivers 52 and 53 are disposed on the rear side of the driver box 50 in the front-rear direction and in the upper portion of the driver box 50 in the up-down direction. In the driver box 50, the raising and lowering drivers 54 and 55 are disposed on the rear side of the driver box 50 in the front-rear direction and below the traveling drivers 52 and 53 in the up-down direction.

In the driver box 50, the fork drivers 56 and 57 are disposed on the front side of the driver box 50 in the front-rear direction and in the upper portion of the driver box 50 in the up-down direction. The fork drivers 56 and 57 and the traveling drivers 52 and 53 are disposed so as to be aligned in the front-rear direction. In the driver box 50, the turning driver 58 is disposed on the front side of the driver box 50 in the front-rear direction and below the fork drivers 56 and 57.

As illustrated in FIG. 8, the raising and lowering drivers 54 and 55 are electrically connected to the corresponding raising and lowering motors 151 of the raising and lowering motor units 15. The raising and lowering drivers 54 and 55 carry out control of motive power supplied to the corresponding raising and lowering motor units 15 on the basis of a control signal from the control device 41. Specifically, the raising and lowering drivers 54 and 55 control the amount of electric current supplied to the corresponding raising and lowering motors 151 of the raising and lowering motor units 15 on the basis of a command signal from the control device 41. More specifically, the raising and lowering drivers 54 and 55 supply an electric current to the corresponding raising and lowering motors 151. In addition, the raising and lowering drivers 54 and 55 control the amount of electric current supplied to the corresponding raising and lowering motors 151 on the basis of information fed back from an encoder (an external encoder or a raising and lowering motor encoder).

The raising and lowering drivers 54 and 55 each include a drive circuit that supplies an electric current to a corresponding one of the raising and lowering motors 151. The raising and lowering driver 54 controls the amount of electric current supplied to the raising and lowering motor 151A of the raising and lowering motor unit 15A. The raising and lowering driver 55 controls the amount of electric current supplied to the raising and lowering motor 151B of the raising and lowering motor unit 15B.

The traveling drivers 52 and 53 are electrically connected to the traveling motor 26 of the traveling motor unit 25. The traveling drivers 52 and 53 carry out control of motive power supplied to the traveling motor unit 25 on the basis of a control signal from the control device 41. Specifically, the traveling drivers 52 and 53 control the amount of electric current supplied to the traveling motor 26 of the traveling motor unit 25 on the basis of a command signal from the control device 41. More specifically, the traveling drivers 52 and 53 supply an electric current to the traveling motor 26. In addition, the traveling drivers 52 and 53 control the amount of electric current supplied to the traveling motor 26 on the basis of information fed back from an encoder (an external encoder or a traveling motor encoder). The traveling drivers 52 and 53 each include a drive circuit that supplies an electric current to the traveling motor 26.

The fork drivers 56 and 57 are electrically connected to the corresponding fork motors 67 and the corresponding encoders 68 of the fork motor units 66. The fork drivers 56 and 57 carry out control of motive power supplied to the corresponding fork motor units 66 on the basis of a control signal from the control device 41. Specifically, the fork drivers 56 and 57 control the amount of electric current supplied to the corresponding fork motors 67 of the fork motor units 66 on the basis of a command signal from the control device 41. More specifically, the fork drivers 56 and 57 supply an electric current to the corresponding fork motors 67. The fork drivers 56 and 57 each include a drive circuit that supplies an electric current to a corresponding one of the fork motors 67.

The fork drivers 56 and 57 each control the amount of electric current supplied to a corresponding one of the fork motors 67 on the basis of an electric signal fed back from a corresponding one of the encoders 68 of the fork motor units 66. The electric signal output from each of the encoders 68 is transmitted to the control device 41 via each of the fork drivers 56 and 57.

The fork driver 56 carries out control of motive power supplied to the fork motor unit 66A. The fork driver 56 is electrically connected to the fork motor 67A and the encoder 68A. The fork driver 57 carries out control of motive power supplied to the fork motor unit 66B. The fork driver 57 is electrically connected to the fork motor 67B and the encoder 68B.

The turning driver 58 is electrically connected to the turning motor 76 and the encoder 77 of the turning motor unit 75. The turning driver 58 carries out control of motive power supplied to the turning motor unit 75 on the basis of a control signal from the control device 41. Specifically, the turning driver 58 carries out control of the amount of electric current supplied to the turning motor 76 of the turning motor unit 75 on the basis of a command signal from the control device 41. The turning driver 58 supplies an electric current to the turning motor 76. In addition, the turning driver 58 controls the amount of electric current supplied to the turning motor 76 on the basis of an electric signal fed back from the encoder 77 of the turning motor unit 75. The turning driver 58 includes a drive circuit that supplies an electric current to the turning motor 76.

The raising and lowering cable 45 is a cable that electrically connects the fork section 60 and the fork drivers 56 and 57 and electrically connects the turning section 70 and the turning driver 58. The raising and lowering cable 45 is a cable capable of performing data communication and supplying power. The raising and lowering cable 45 is a fusing cable and has 12 cables which are fused so as to be aligned in one row in a plate-like manner. The cable length of the raising and lowering cable 45 is a length falling within 20 m. As illustrated in FIG. 3, the raising and lowering cable 45 is raised and lowered with respect to the first mast 10A in accordance with the raising and lowering of the carriage 30. The raising and lowering cable 45 is provided on the front side of the first mast 10A. That is, the raising and lowering cable 45 is attached to the first mast 10A on the same side as the side on which the driver box 50 is provided with respect to the first mast 10A in the front-rear direction orthogonal to the traveling direction D1.

As described above, attaching the raising and lowering cable 45 to the first mast 10A on the same side on which the driver box 50 is attached to the first mast 10A eliminates the need to wind the raising and lowering cable 45 around the first mast 10A to attach the raising and lowering cable 45 to the first mast 10A. This makes it possible to shorten the cable length of the raising and lowering cable 45.

The raising and lowering cable 45 includes, for example, a cable for connecting a sensor(s) (not illustrated) provided in the carriage 30 and a control substrate disposed in the driver box 50. The raising and lowering cable 45 also includes a cable for performing data communication and supplying power between the fork drivers 56 and 57 and the corresponding fork motor units 66 and a cable for performing data communication and supplying power between the turning driver 58 and the turning motor unit 75. That is, the cable for connecting the fork drivers 56 and 57 and the corresponding fork motor units 66 and the cable for connecting the turning driver 58 and the turning motor unit 75 are combined into one raising and lowering cable 45 for connecting with various devices mounted to the carriage 30.

Conventionally, the fork drivers 56 and 57 and the turning driver 58 were mounted to the carriage 30. However, according to the present invention, the fork drivers 56 and 57 and the turning driver 58 that control motive power (electric current) supplied to the corresponding fork motor units 66 of the fork section 60 mounted to the carriage 30 and the turning motor unit 75 of the turning section 70 are disposed outside the carriage 30. Thus, it is possible to reduce the weight of the carriage 30 by an amount corresponding to the weights of the fork drivers 56 and 57 and the turning driver 58 which were mounted to the carriage 30. This makes it possible to achieve weight reduction of the carriage 30.

With achievement of the weight reduction of the carriage 30, an upper limit of the weight of an article that can be raised and lowered by the carriage 30 can be increased by an amount corresponding to the weights of the fork drivers 56 and 57 and the turning driver 58. In addition, with achievement of the weight reduction of the carriage 30, it is also possible to increase the speed of a raising and lowering operation of the carriage 30. Furthermore, it is possible to reduce a voltage applied to the raising and lowering motors 151 of the raising and lowering motor units 15. Thus, it is also possible to reduce the power supplied to the raising and lowering motor units 15.

Further, according to the present invention, there is no need to provide a space for mounting the fork drivers 56 and 57 and the turning driver 58 with respect to the carriage 30. Thus, it is possible to reduce the size of the carriage 30 in the traveling direction D1. This makes it possible to reduce the size of the stacker crane 1 in the traveling direction D1.

Aspects of the present invention can also be expressed as follows:

A stacker crane in accordance with a first aspect of the present invention includes: a mast; a carriage provided so as to be capable of being raised and lowered with respect to the mast; a movable section mounted to the carriage and configured to be movable with respect to the carriage; and a movement control instrument configured to control motive power supplied to the movable section, the movement control instrument being disposed outside the carriage.

According to the stacker crane in accordance with the first aspect, the movement control instrument that controls motive power supplied to the movable section which is mounted to the carriage is disposed outside the carriage. Thus, the weight of the carriage can be reduced by an amount corresponding to the weight of the movement control instrument. This makes it possible to achieve weight reduction of the carriage.

In a second aspect of the present invention, the stacker crane may be configured, in the first aspect, such that the movement control instrument is housed in a casing that is attached to the mast. According to the stacker crane in accordance with the second aspect, the movement control instrument is housed in the casing that is attached to the mast. Thus, a distance between the movement control instrument and the movable section can be shortened. This makes it possible to shorten the cable length of the cable for connecting the movement control instrument and the movable section.

In a third aspect of the present invention, the stacker crane may be configured, in the second aspect, to further include: a raising and lowering control instrument configured to control motive power supplied to a lifting section that is configured to raise and lower the carriage; a traveling section on which the mast is erected; and a traveling control instrument configured to control motive power supplied to the traveling section, the raising and lowering control instrument and the traveling control instrument each being housed in the casing.

According to the stacker crane in accordance with the third aspect, the control instruments that control the members provided in the stacker crane are congregated in one casing. This makes it possible to improve the work efficiency of maintenance of the control instruments by a user.

In a fourth aspect of the present invention, the stacker crane may be configured, in the second or third aspect, such that the casing is attached to the mast in a direction that is orthogonal to a direction in which the traveling section travels and that is orthogonal to a direction in which the mast extends.

According to the stacker crane in accordance with the fourth aspect, the casing in which the control instruments are disposed is not located on a side more outward of the stacker crane than the mast in the traveling direction. Therefore, it is possible to reduce the size of the stacker crane in the traveling direction.

In a fifth aspect of the present invention, the stacker crane may be configured, in the second to fourth aspects, such that the stacker crane includes a plurality of the masts that are spaced apart from each other in a direction in which the traveling section travels, and the casing is attached to the mast that is provided on a side closer to a home position which is located on one end side of a traveling path through which the traveling section travels.

According to the stacker crane in accordance with the fifth aspect, when the stacker crane is at the home position, the user can easily access the casing. This makes it possible to improve the work efficiency of maintenance of the control instruments by a user.

In a sixth aspect of the present invention, the stacker crane may be configured, in the second to fifth aspects, to further include a raising and lowering cable for electrically connecting the movable section and the movement control instrument, the raising and lowering cable being attached to the mast on the same side as the side on which the casing is attached to the mast.

According to the stacker crane in accordance with the sixth aspect, attaching the raising and lowering cable to the mast on the same side as the side on which the casing is attached to the mast eliminates the need to wind the raising and lowering cable around the mast to attach the raising and lowering cable to the mast. This makes it possible to shorten the cable length of the raising and lowering cable.

In a seventh aspect of the present invention, the stacker crane may be configured, in the sixth aspect, such that the stacker crane includes a plurality of the masts that are spaced apart from each other in the direction in which the traveling section travels, the carriage is provided with a connector plate into which a connector for connecting the raising and lowering cable is installed, and in the direction in which the traveling section travels, the connector plate is located on a side closer to the mast to which the casing is attached.

According to the stacker crane in accordance with the seventh aspect, it is possible to shorten a distance between the movement control instrument and the connector plate in the traveling direction. This makes it possible to shorten the cable length of the raising and lowering cable.

In an eighth aspect of the present invention, the stacker crane may be configured, in the seventh aspect, such that the connector plate is located on a side on which the casing is located in a direction orthogonal to the direction in which the traveling section travels.

According to the stacker crane in accordance with the eighth aspect, it is possible to shorten a distance between the movement control instrument and the connector plate in a direction that is orthogonal to the traveling direction and that is orthogonal to a direction in which the mast extends. This makes it possible to further shorten the cable length of the raising and lowering cable.

In a ninth aspect of the present invention, the stacker crane may be configured, in the first to eighth aspects, such that the movement control instrument controls an electric current supplied to a drive unit that the movable section has.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: stacker crane
2A, 2B: load shelf
10: mast
15: raising and lowering motor unit
20: traveling vehicle
25: traveling motor unit

30: carriage
38: connector plate
40: control box
45: raising and lowering cable
50: driver box
52, 53: traveling driver
54, 55: raising and lowering driver
56, 57: fork driver
58: turning driver
60: fork section
70: turning section
100: article transport system

The invention claimed is:

1. A stacker crane comprising:
a mast;
a traveling section on which the mast is erected;
a carriage provided so as to be capable of being raised and lowered with respect to the mast;
a movable section mounted to the carriage and configured to be movable with respect to the carriage;
a movement control instrument configured to control motive power supplied to the movable section, and
a raising and lowering cable for electrically connecting the movable section and the movement control instrument,
the movement control instrument being disposed outside the carriage, and being housed in a casing that is attached to the mast,
the casing being attached to the mast in a direction that is orthogonal to a direction in which the traveling section travels and that is orthogonal to a direction in which the mast extends,
the raising and lowering cable being attached to the mast on the same side as the side on which the casing is attached to the mast.

2. The stacker crane according to claim 1, further comprising:
a raising and lowering control instrument configured to control motive power supplied to a lifting section that is configured to raise and lower the carriage;
and
a traveling control instrument configured to control motive power supplied to the traveling section,
the raising and lowering control instrument and the traveling control instrument each being housed in the casing.

3. The stacker crane according to claim 2, wherein
the stacker crane comprises a plurality of the masts that are spaced apart from each other in a direction in which the traveling section travels, and
the casing is attached to the mast that is provided on a side closer to a home position which is located on one end side of a traveling path through which the traveling section travels.

4. The stacker crane according to claim 1, wherein
the stacker crane comprises a plurality of the masts that are spaced apart from each other in the direction in which the traveling section travels,
the carriage is provided with a connector plate into which a connector for connecting the raising and lowering cable is installed, and
in the direction in which the traveling section travels, the connector plate is located on a side closer to the mast to which the casing is attached.

5. The stacker crane according to claim 4, wherein
the connector plate is located on a side on which the casing is located in a direction orthogonal to the direction in which the traveling section travels.

6. The stacker crane according to claim 1, wherein the movement control instrument controls an electric current supplied to a drive unit that the movable section has.

7. The stacker crane according to claim 4, wherein
the carriage includes a cable box in which cables for connecting a device mounted to the carriage and a device disposed outside the carriage are congregated,
the cable box is located on a side closer to the mast to which the casing is attached, and
the cable box is provided with the connector plate.

8. The stacker crane according to claim 7, wherein
the connector plate is provided at a lower portion of the carriage.

9. The stacker crane according to claim 1, further comprising a computer that includes a processor configured to control the movement control instrument, wherein
the computer is housed in a control box that is attached to the mast and that is a housing different from the casing.

10. The stacker crane according to claim 9, wherein
the control box is attached to the mast in a direction that is orthogonal to the direction in which the traveling section travels and that is orthogonal to the direction in which the mast extends, and
the casing is attached to the mast on a side opposite to the side on which the control box is attached to the mast.

11. The stacker crane according to claim 1, wherein
the raising and lowering cable includes a cable for supplying the motive power from the movement control instrument to the movable section, and a cable for performing communication between the movement control instrument and the movable section.

* * * * *